(12) United States Patent
Shioyama et al.

(10) Patent No.: US 7,676,689 B1
(45) Date of Patent: Mar. 9, 2010

(54) BROWSING AND SELECTING ITEMS IN RECOVERY STORAGE GROUPS TO PERFORM RECOVERY ONTO PRODUCTION SERVER

(75) Inventors: George Scott Shioyama, Renton, WA (US); Scott Forrest Bingham, Sammamish, WA (US); Patrick M. Simonich, Kent, WA (US); Upanshu Singhal, Redmond, WA (US)

(73) Assignee: EMC Corporation, Hopkinton, MA (US)

( * ) Notice: Subject to any disclaimer, the term of this patent is extended or adjusted under 35 U.S.C. 154(b) by 550 days.

(21) Appl. No.: 11/428,117

(22) Filed: Jun. 30, 2006

(51) Int. Cl.
*G06F 11/00* (2006.01)
(52) U.S. Cl. .......................................................... 714/6
(58) Field of Classification Search ................ None
See application file for complete search history.

(56) References Cited

U.S. PATENT DOCUMENTS 7,275,142 B1 * 9/2007 Schultz et al. .............. 711/162
2005/0144520 A1 * 6/2005 Tuma et al. .................. 714/15
2006/0015641 A1 * 1/2006 Ocko et al. .................. 709/236

OTHER PUBLICATIONS

Paragon Drive Backup Enterprise Server Edition Best Practices for MS Exchange Server, Jun. 15, 2006.*
Wayback Machine retrieval results for cited reference.*

* cited by examiner

*Primary Examiner*—Michael C Maskulinski
(74) *Attorney, Agent, or Firm*—Workman Nydegger

(57) ABSTRACT

A method and system for restoring data on a production server by recovering individual data objects from a recovery storage group to a database residing on the production server. In one example method, a recovery interface accesses a recovery storage group containing a recovered database. The recovered database has been recovered from a backup storage location and contains a copy of a database residing on the production server. The method then identifies each data object residing in the recovery storage group and displays each of the data objects on a graphical user interface configured to allow a user to select and individual data objects for recovery from the recovered database. The selected data objects are restored to the appropriate location on the production server.

20 Claims, 4 Drawing Sheets

BROWSING AND SELECTING ITEMS IN RECOVERY STORAGE GROUPS TO PERFORM RECOVERY ONTO PRODUCTION SERVER

BACKGROUND

1. The Field of the Invention

The present invention relates generally to systems and methods for backing up and recovering data. More specifically, the present invention relates to methods and systems for selecting individual data objects from a recovery storage group and restoring selected data objects to a production server.

2. The Relevant Technology

In this society where many personal and business interactions are data driven, data can become easily lost or corrupted due to events such as system failures, viruses, power outages, etc. Backing up data has become an important feature of computer networks because of this increasing dependence upon computers and networks to perform vital business and personal functions. The ability to easily, accurately and reliably access data is expected by anyone accessing a computer and/or network.

Backup and recovery of data are typically accomplished through the use of software that creates a backup copy of data and that recovers the data from the backup copy. As the amount of data continues to increase, and as the applications for creating data become more complex, backing up and recovering the data becomes more challenging. However, after backing up certain types of databases, either the entire database has to be restored, or a filter can be used to restore a portion of the database. However, the filter is useful only if the user knows what data is contained on the database in order to be able to configured filter parameters. Thus, after a backup is created of a production server database, it would be advantageous to be able to restore individual data objects from the backup database so that large amounts of data are not unnecessarily recovered from the backup database during recovery operations.

BRIEF DESCRIPTION OF THE DRAWINGS

To further clarify the features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
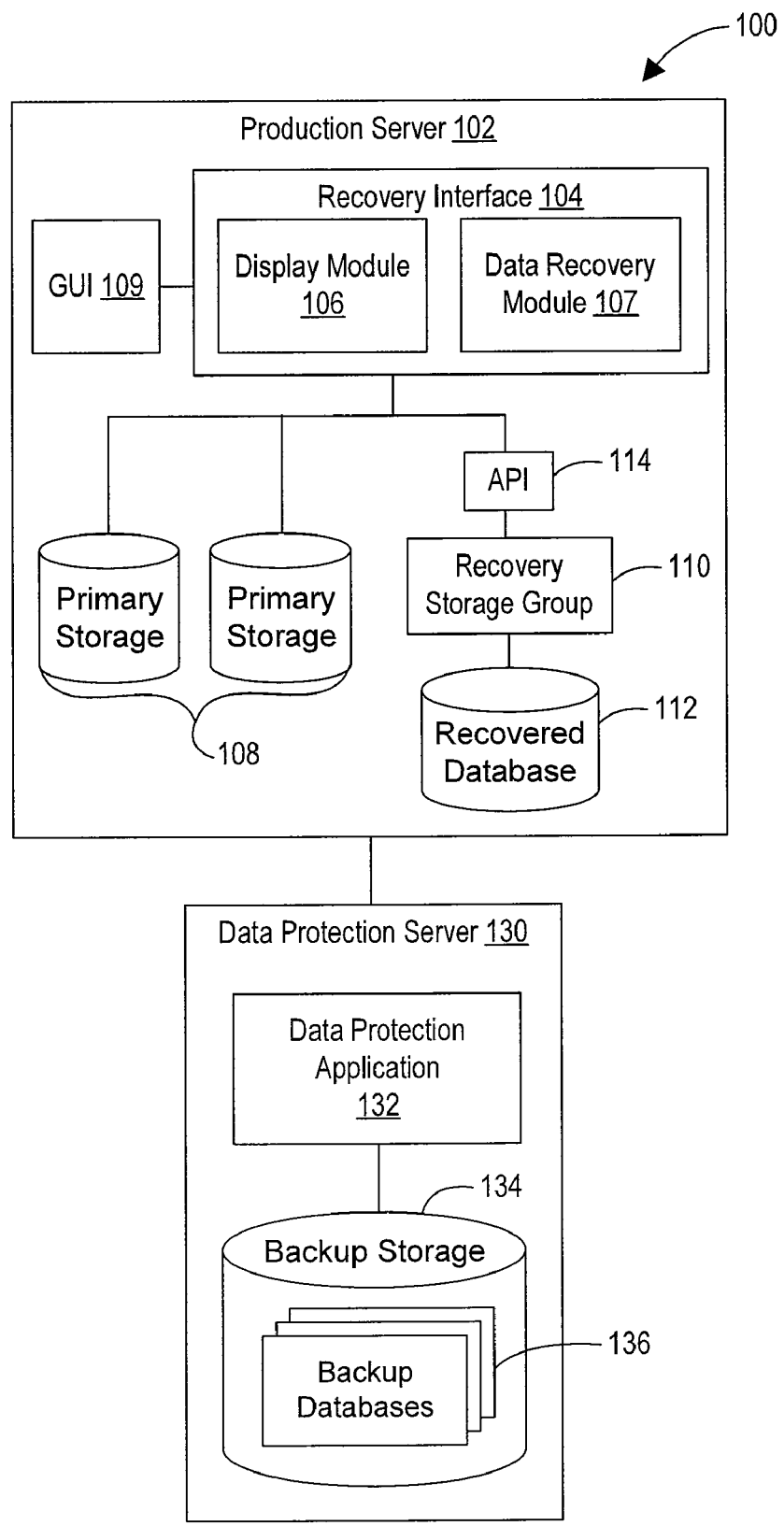
FIG. 1 illustrates an example of a system for performing backup and recovery operations for a production server.

In the following detailed description of various embodiments of the invention, reference is made to the accompanying drawings which form a part hereof, and in which are shown by way of illustration specific embodiments of the invention. It is to be understood that other embodiments may be utilized and structural changes may be made without departing from the scope of the present invention.

Embodiments of the present invention provide for methods and systems for restoring a database residing on a production server by recovering individual data objects from a recovery storage group to a production server database. Each production server database may be protected by creating a backup copy of the database at a backup storage location. When one of the backup copies is recovered, for example, after a system crash or other disaster, the backup copy is copied from the backup storage location to a recovery storage group residing on the production server. The present invention then identifies each data object residing in the recovery storage group and displays each of the identified data objects on a graphical user interface configured to allow a user to select and recover the data objects on an individual basis. A user can then select one or more of the displayed data objects for recovery. The selected data objects are retrieved from the recovery storage group and are restored to the appropriate location on the production server.

In one embodiment, the invention is applied to a mail exchange production server environment. The present invention allows an administrator to recover individual mail exchange data objects from a recovery storage group without being required to recover an entire database or a large group of data when only a limited number of data objects need to be recovered.

As used herein, the terms "data" and "data object" may include, but are not limited to, directories (e.g., volumes, file systems, and the like), user data, system data, applications, services, operating systems, instructions, and the like, that can be stored on one or more storage devices of a computer. Backing up or recovering the data may include backing up or recovering any of the data herein defined or understood by those of skill in the art. Data may be organized in logical directories that do not necessarily correspond to a particular storage device. The term "directory" can be used interchangeably with the term "volume" or "file system" to refer to any means of logically organizing data on a computer.

Certain embodiments described herein will involve electronic communication between a client computer system (hereinafter referred to as a "client") requesting access to a network service at a server computer system (hereinafter referred to as a "server"). Accordingly, the client sends a request to the server for access to its system resources, wherein if the client is authorized and validated, the server responds with a response message providing the desired information. Of course, other messaging patterns between client and server are available, as are well known in the art.

As used herein, the term "user" may refer to a person operating the server (e.g., administrator). Alternatively, the term "user" may refer to a person at a client or management console. Users are able to initiate a request for backup and/or restore, although it will be appreciated that the server may have additional functionalities not available to the client or management console.

Referring now to FIG. 1, a more detailed example is illustrated using a diagrammed reference to a distributed network 100. The distributed network 100 may include a production server 102 and a data protection server 130. The production server 102 may communicate with one or more client systems, as described above, and may provide one or more primary storage databases 108 containing data for users of the client systems.

The data included in the primary storage databases 108 may be protected by creating a backup database 136 at a backup storage 134. Each backup database 136 includes a copy of one of the primary storage databases 108 from the production server 102. The backup storage 134 may include various types of storage devices commonly used for data backup purposes, including but not limited to magnetic storage, semiconductor storage, optical disk storage, Continuous Data Protection (CDP) storage, Network Attached Storage, Direct Attached Storage, and the like, and combinations thereof. The backup storage 134 may further form a node on a network or a storage device on a storage area network (SAN), and may include a storage device located at an off-site location for protecting against local disasters, such as flood, fire, theft, and the like. The data protection server 130 may operate under a different operating system or platform than the production server 102. Further, the backup storage 134 may be located remotely from data protection server 130.

The data protection server 130 may include a data protection application 132 that may perform various backup and recovery functions. The data protection application 132 may provide a variety of services to facilitate data protection of the production server 102. For example, data protection application 132 may be configured to manage mirroring operations of the data residing in primary storage databases 108. The data protection application 132 may also perform automated backup and recovery operations of primary storage databases 108 in accordance with a predefined schedule. Furthermore, the data protection application 132 may also facilitate the backup and recovery of data to and from storage locations having unique capabilities, such as CDP storage. The data protection application 132 may further be configured to deliver data protection and management for direct attached storage (DAS), network attached storage (NAS), storage area network (SAN), and other storage environments.

Although the data protection application 132 may consist of backup and recovery software features from any number of manufacturers, the data protection application 132 may include various features, including, but not limited to, advanced indexing, high-speed parallelism, automated media management, LAN-free backup, cluster awareness, and dynamic tape-drive sharing. Further, the data protection application 132 can also coordinate other functions, such as, but not limited to, data mining, data consistency analysis, mirroring, backup, and recovery, and the like.

When data residing in one of the primary storage databases 108 is corrupted, lost, or otherwise must be replaced, a recovery operation can be performed of the corresponding backup database 136 residing in the backup storage 134. To perform a data recovery operation of one of the primary storage databases 108, the corresponding backup database 136 having the data being recovered is copied from the backup storage 134 to a recovery storage group 110, in the form of a recovered database 112. In one embodiment, the data protection application 132 is configured to manage the copying of the backup database 136 to the recovery storage group 110.

The recovered database 112 can then be used to restore the lost or corrupted data on the primary storage 108. Conventionally, many production servers 102 include a recovery interface that requires that the entire recovered database 112 be copied to the primary storage 108 during a recovery operation, and does not provide the user with the ability to access or recover individual data objects from the recovered database 112. Alternatively, some conventional production server 102 environments allow a user to use a filtering technique to provide general parameters as to which data residing in the recovered database 112 will be copied to the primary storage database 108 that is being restored. For example, a user may, in a conventional environment, be allowed to submit parameters in the form of a date range, wherein all of the data objects residing within the recovered database 112 that have been either created or altered within the specified date range will be copied from the recovered database 112 to the primary storage database 108 being restored. However, the user must have specific knowledge of acceptable parameters and, even in this case, the user is still unable to identify or select the individual data objects that fall within the parameter range specified by the user.

Therefore, in either of the above described conventional environments, when performing a recovery operation, the user is often required to copy a large amount of data, or even the entire recovered database 112, even when only a small number of data objects residing in the recovered database 112 need to be recovered. Consequently, processing resources, time, and other resources are often wasted by moving a large amount of unneeded data from the recovered database 112 to the primary storage database 108 being restored. Furthermore, in some cases, it would be desirable to be able to restore only a certain portion of the primary storage 108. For example, at the time that data is corrupted, data in the primary storage 108 may have been changed by a user since the time at which the backup database 136 being used for the recovery was created. For efficiency, it would be desirable to be able to recover the corrupted data without losing the good changes that have occurred to the data since the last backup. Therefore, under the conventional scheme, while recovering the corrupted data, the changes made to the non-corrupted data will be lost if the user is required to restore the entire database during the recovery operation.

In order to more efficiently recover the data objects residing within the recovered database 112, the present invention provides systems and methods for recovering individual data objects in a system that otherwise requires the recovery of larger blocks of data or entire databases. In accordance with the present invention, once the recovered database 112 is created by copying one or more of the backup databases 136 from the backup storage 134 to the recovery storage group 110, the production server 102 utilizes means for identifying each data object residing within the recovered database 112. In one embodiment, means for identifying data objects in a recovered database include an application programming interface (API) 114 that parses the data located in the recovery database 112 into separate data objects, which may include, for example, files, folders, directories, user data, system data, applications, services, operating systems, instructions, and the like. Application programming interface 114 can be formed as part of the recovery interface 104 or can be programmed as a separate module that interfaces between application programming interface 114 and recovery storage group 110.

In one embodiment, the data parsing of the recovered database 112 is managed by a data recovery module 107 of a recovery interface 104. The data objects that are identified within the recovered database 112 are then displayed on a graphical user interface 109 by a display module 106. The graphical user interface 109 can be part of the same programming as the recovery interface 104 or can be configured as a separate module that is accessed by recovery interface 104. In one embodiment, the data objects are displayed by display module 106 hierarchically, for example, in accordance with the interrelationship between folders, files, and the like. A user may access the graphical user interface 109 and may select individual data items located within the recovered database 112 to be restored to one of the primary storage databases 108. After the user selects the data objects to be restored, the data recovery module 107 moves, copies or otherwise restores the selected data items from the recovered database 112 to the appropriate location within the primary storage databases 108.

In one embodiment, each data object copied from the recovered database 112 includes metadata describing its original location within the primary storage databases 108 prior to being backed up to the backup storage 134. Therefore, when the data objects are restored from the recovered database 112, the production server 102 may move or copy the data objects to their original locations on the appropriate primary storage databases 108. Alternatively, the recovery interface 104 may allow a user to manually control the target destination of the recovered data objects. The recovery interface 104 can be accessed locally at the production server 102 or remotely from data protection server 130.

Figure 2:
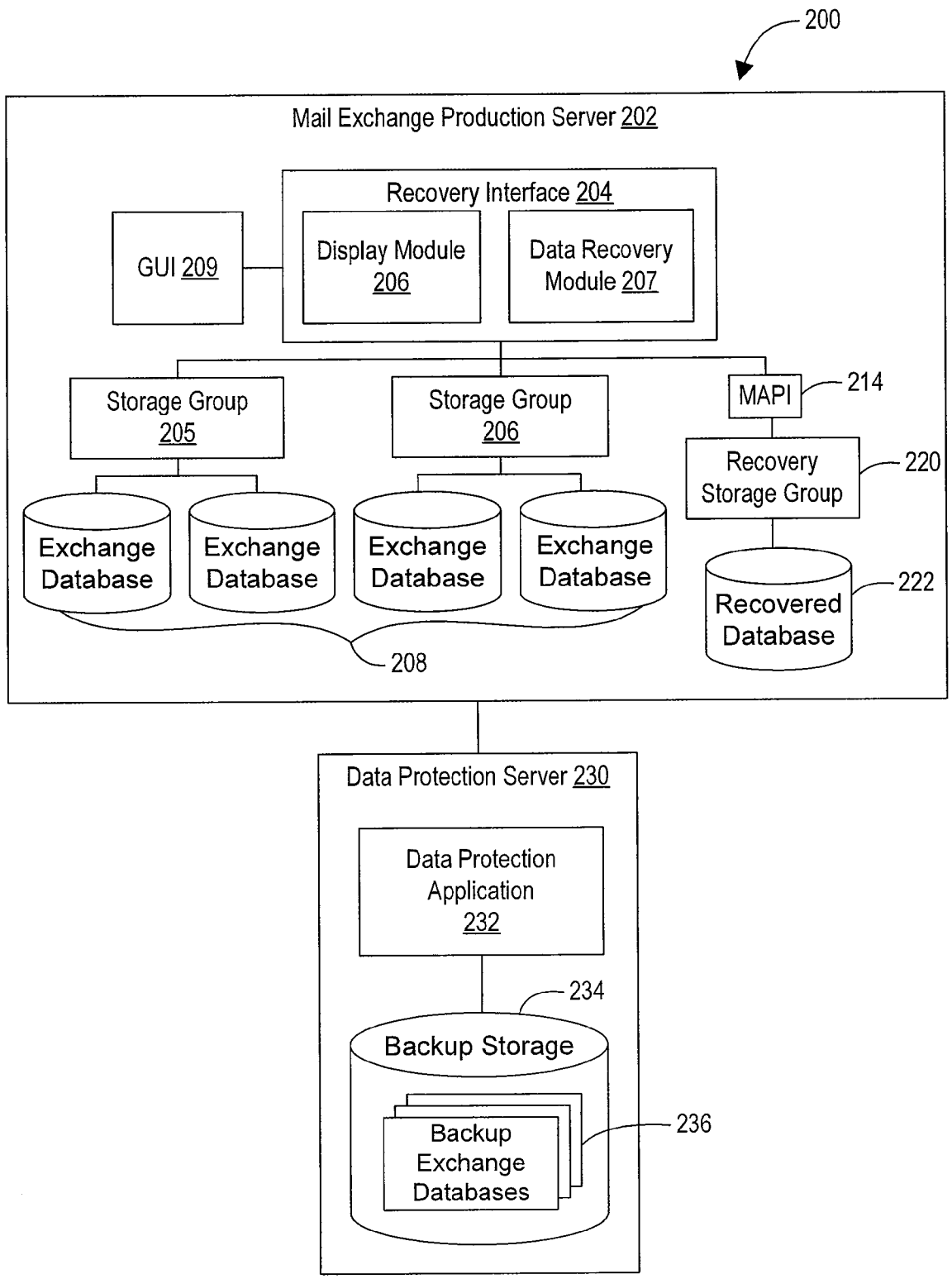
FIG. 2 illustrates an example of a system for performing backup and recovery operations for a mail exchange production server.

In one embodiment, as illustrated in FIG. 2, the principles of the present invention are employed to restore individual data objects residing on a mail exchange production server 202. Examples of mail exchange production servers include Microsoft Exchange, Lotus Notes/Domino, Scalix, OpenXchange, exchange4linux, Zarafa, and the like. In general, the mail exchange production server 202 includes a computer program or software agent that transfers electronic mail messages from one computer to another, as well as storing and managing electronic messages. In addition to managing electronic mail, a mail exchange production server may manage other types of data, including calendar data, journal entries, notes, task lists, contact information, and the like. Therefore, the terms "mail", "electronic mail", "user data", "exchange data", and "mail exchange production server" should be read to include the above-mentioned data types, in addition to other types of data that may be managed by an exchange production server.

The exemplary mail exchange production server 202 illustrated in FIG. 2 divides data into storage groups 205 and 206. Although the example illustrated in FIG. 2 only includes two storage groups 205 and 206, the exchange production server 202 may include more or less than two storage groups. Each storage group 205 and 206 contains one or more exchange databases 208 for storing user data. As described above, each exchange database 208 may store electronic messages, calendar data, journal entries, notes, task lists, contact information, and the like, for one or more users. Each user may access his or her data from mail exchange production server 202 through a network connection.

In order to protect the data stored on the exemplary mail exchange production server 202, the exchange databases 208 are backed up to the backup storage 234. As described above, the data protection application 232 may manage the backup and recovery operations of the backup exchange databases 236. When the user data located in one of the exchange databases 208 are lost, corrupted, or otherwise are in need of being recovered, the corresponding backup exchange database 236 is copied to the recovery storage group 220, shown as recovered database 222. In one embodiment, the data protection application 232 manages the copying of the backup exchange database 236 from the backup storage 234 to the recovery storage group 220.

As described previously, in some conventional mail exchange production environments, such as Microsoft Exchange, the mail exchange production server 202 is required to replace an entire exchange database 208 with the entire recovered database 222 during a recovery operation. Or, alternatively, the administrator's control over what data items are recovered is limited to recovering data blocks using the filtering techniques described above. However, in order to allow a user to recover individual data objects from the recovered database 222, and in accordance with the present invention, each of the data objects located in the recovered database 222 is parsed in order to be able to identify the distinct data objects. Then, the display module 206 displays each of the individual data objects located in the recovered database 222 on the graphical user interface 209 to the administrator. The administrator is then able to select individual data objects displayed in the graphical user interface 209 for recovery. The selected data objects can then be moved or copied from the recovered database 222 to the appropriate exchange database 208.

In one embodiment, after the recovered database 222 is created by copying one or more of the backup exchange databases 236 from the backup storage 234 to the recovery storage group 220, the data recovery module 207 utilizes a Messaging Application Programming Interface (MAPI) 214 for identifying each data object residing within the recovered database 222. The MAPI 214 includes a set of functions for standardizing the way messages are handled by mail-enabled applications. In particular, the MAPI 214 may be configured to parse the data located in the recovery database 222 into separate identifiable data objects, which may include, for example, files, folders, directories, user data, calendar data, journal entries, notes, task lists, contact information, and the like. The MAPI 214 provides the recovery interface 204 with the identified data objects and the organization of the data objects so that the data objects can be displayed by display module 206 on the graphical user interface 209. Although the MAPI 214 may be developed by various companies, in one embodiment, the MAPI 214 is developed by Microsoft Corporation.

To summarize, the data located in the exchange databases are protected by saving copies of the exchange databases to the backup storage 234. When data contained in one of the exchange databases needs to be recovered, the corresponding backup exchange database 236 is copied from the backup storage 234 to the recovered database 222 of the recovery storage group 220. The present invention provides means for identifying each of the data objects contained within the recovered database 222 (e.g., MAPI 214). The data objects are displayed by a display module 206 on a graphical user interface 209, which allows a user to select individual data objects to be recovered. After receiving a selection from the user, the data recovery module 207 moves or copies the selected data items from the recovered database 222 to the appropriate location in the exchange database 208.

Figure 3:
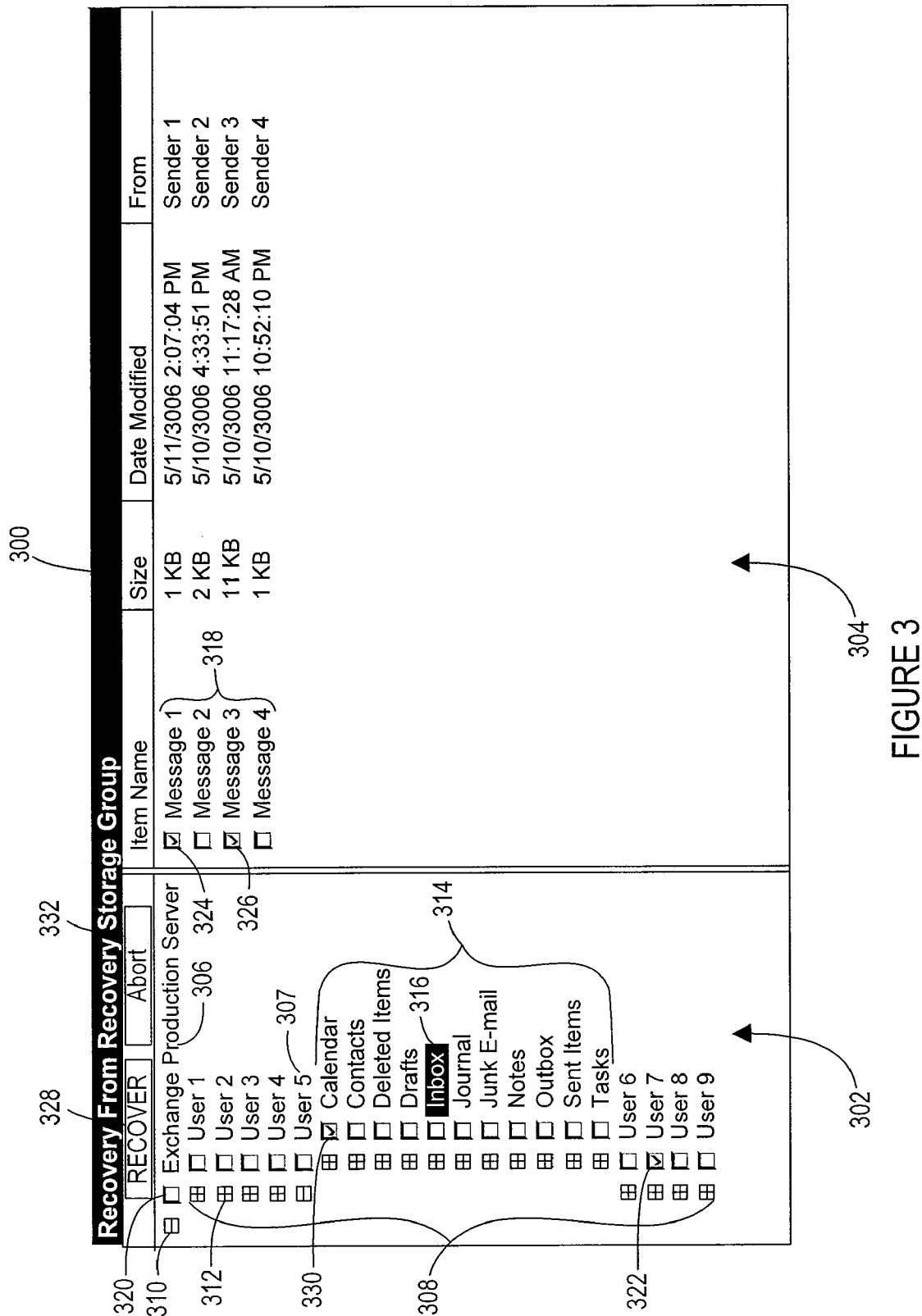
FIG. 3 illustrates an exemplary graphical user interface for recovering individual data objects from a recovery storage group.

FIG. 3 provides one exemplary graphical user interface 300 that provides an administrator with a depiction of the contents of a backed-up exchange database that has been recovered to the recovery storage group. The exemplary graphical user interface 300 is divided into a navigation panel 302 and a data object list panel 304. Referring to FIGS. 2 and 3, the navigation panel 302 and the data object list panel 304 provide a depiction of how data located on one of the exchange databases 208 appeared at the time the exchange database was backed up to the backup storage 234. As illustrated in FIG. 3, the navigation panel 302 may provide a hierarchical tree display of all data objects that are available for recovery. For example, the navigation panel 302 may include a root or parent node 306, which may include the "Exchange Production Server", as in the present example, or may include a subset of the exchange production server, such as the name of one of the exchange databases contained within the exchange production server.

Each node can be collapsed and expanded by selecting the minus box 310 or a plus box 312, respectively. Similar to many conventional hierarchical tree displays, when a node is expanded, one or more sub-nodes associated with the expanded node are also displayed. For example, by expanding the parent node 306, Users 1-9 308 are displayed, and by expanding "User 5" 307, the categorized user data 314 associated with "User 5" are displayed. Each of the Users 308 represents a separate user having an account on the exchange production server 306. As illustrated by the categorized user data 314, each user has user data associated therewith which may include, for example, calendar data, contact data, deleted items, drafts of electronic messages, an inbox, journal data, junk e-mail, notes, an outbox, sent items, tasks, and the like.

Upon selecting one of the categorized items located within user data 314, the data objects associated with the selected category appear within the data object list panel 304. For example, as illustrated in FIG. 3, upon selecting the Inbox 316 of "User 5", the Inbox 316 is highlighted and the messages 318 within the inbox 316 appear within the data objects list panel 304.

An administrator may select individual data objects or groups of data objects to be recovered by checking one of the checkboxes exemplified by checkbox 320. If the administrator would like to recover an individual data object, the administrator may select the check box corresponding to the data object located within the data object list panel 304. As illustrated in FIG. 3, by selecting the check boxes 324 and 326 for "Message 1" and "Message 3", respectively, the administrator can identify that Messages 1 and 3 will be restored to "User 5's" inbox, located on one of the exchange databases 208 of FIG. 2.

Furthermore, by displaying the data objects in a hierarchical manner, the administrator can also recover data using various granularities other than by individual data object. In one embodiment, a user can select an entire category of user data 314 by selecting the checkbox corresponding to the category to be recovered. For example, as illustrated in FIG. 3, by selecting checkbox 330 for the "Calendar" category, the administrator can move or copy the entire calendar category, including all the data objects (e.g., appointments, meetings, folders, and the like) included within User 5's calendar to the appropriate location on one of the exchange databases 208 of FIG. 2 without having to select the individual data objects in the User 5's calendar.

The administrator can also recover all data for a particular user 308 by selecting the checkbox corresponding to the user to be recovered. For example, as illustrated in FIG. 3, by selecting checkbox 322 for "User 7", the administrator can move or copy all user data associated with User 7, including all categorized data and their corresponding data objects to the appropriate location on one of the exchange databases 208 of FIG. 2. Similarly, the administrator can recover an entire database by selecting checkbox 320 for the parent node 306.

After the administrator has selected the checkboxes for the individual data objects and/or data groups to be recovered, the administrator may initiate a recovery operation of the selected data items by selecting a "Recover" icon 328. The data recovery operation may be terminated by selecting an "Abort" icon 332. As mentioned above, because the data objects may have metadata that identify the originating storage location of the data object, the administrator does not need to necessarily specify a recovery destination for the data being recovered. However, graphical user interface 300 may also include icons, fields and/or other mechanisms for allowing an administrator to select a recovery destination.

Figure 4:
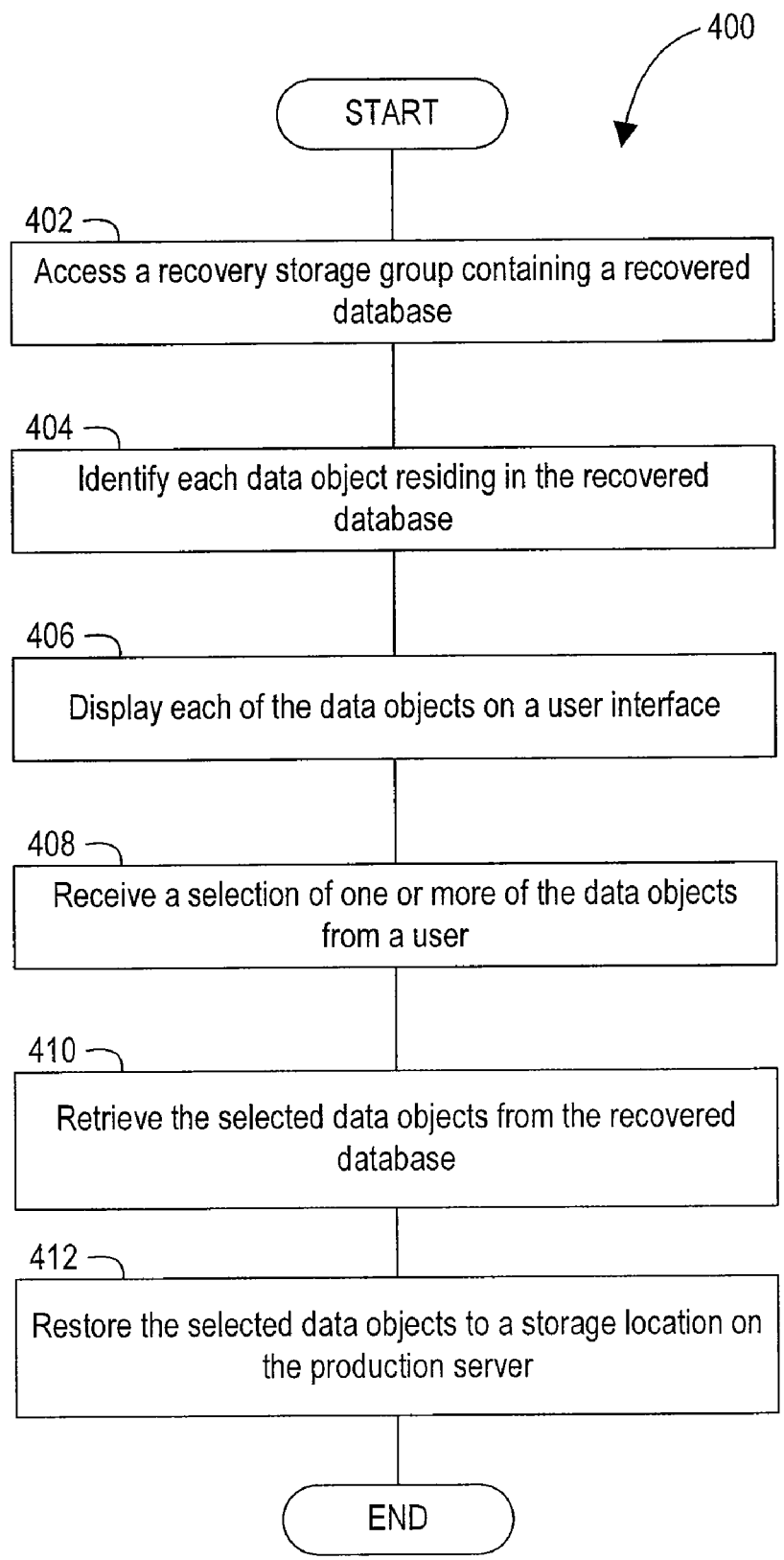
FIG. 4 illustrates an example of a method for recovering individual data objects from a recovery storage group.

Referring now to FIG. 4, a method 400 of performing data recovery of individual data objects in a data recovery system that typically requires the recovery of an entire database is illustrated. The method 400 may be practiced, for example, in a distributed network including a production server and a backup storage location. The method 400 includes, at 402, accessing a recovery storage group containing a recovered database that has been recovered from a backup storage location. Referring once again to FIG. 1, an illustrative example of a distributed network 100 having a production server 102 is illustrated. The recovery storage group 110 having a recovered database 112 is accessed by a recovery interface 104.

In one embodiment, accessing a recovery storage group containing a recovered database that has been recovered from a backup storage location may include copying a backed up database from a backup storage location to a recovery storage group located on the production server. As illustrated in FIG. 1, the backed up database 136 may contain a copy of a database 108 originally located on the production server 102.

At 404, the method 400 further includes identifying each data object residing in the recovered database. In one embodiment, identifying each data object residing in the recovered database may include utilizing an application programming interface configured for parsing a database that otherwise does not provide information regarding individual data objects. By parsing the database, the application programming interface is able to identify the individual data objects residing therein.

At 406, the method 400 also includes displaying each of the data objects on a graphical user interface configured to allow a user to select individual data objects for recovery from the recovered database. Thus, as illustrated in FIG. 3, the data objects identified in the recovered database are displayed on a graphical user interface 300. As described previously, the graphical user interface 300 allows individual data objects to be selected for recovery. In one embodiment, as illustrated in FIG. 3, the data objects are organized on the graphical user interface in a hierarchical manner in order to facilitate navigation of the data objects.

At 408, the method 400 further includes receiving a selection of one or more of the data objects from a user via the graphical user interface. The selected data objects are then retrieved, at 410, from the recovered database. The method 400, at 412, further includes restoring the selected data objects to a storage location on the production server. In one embodiment, the selected data objects are automatically restored to the same storage location that they originally resided in prior to being backed up to the recovered database. Alternatively, the location to which the selected data objects are restored to can be manually controlled, for example, by a system administrator. For example, an administrator could instead choose to restore the data objects to a different location.

In one embodiment, the production server described in method 400 is a mail exchange production server, such as the mail exchange production server 202 illustrated in FIG. 2. Similarly, the recovered database is a backup copy of an exchange database residing on the mail exchange production server. The recovered exchange database may contain mail data objects from one or more users. In a conventional environment, it is necessary to restore the entire recovered exchange database when performing a data recovery operation of the mail data. Therefore, in order to identify the individual data objects located in the recovered exchange database, the MAPI may be employed for parsing the recovered exchange database. The identified data objects may include, but are not limited to, folders, electronic mail items, calendar entries, users, contact data, journal entries, notes, and tasks.

Embodiments herein may comprise a special purpose or general-purpose computer including various computer hardware. Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a distributed network comprising a production server and a backup storage location, the production server employing a recovery storage group for performing data recovery operations, a method for performing data recovery of individual data objects, the method comprising:
    recovering a backup database from a backup storage location into a recovered database in a recovery storage group at the production server;
    accessing the recovery storage group containing the recovered database that has been recovered from the backup database stored in the backup storage location;
    parsing the data located in the recovered database into separate data objects to identify each individual data object residing in the recovered database;
    displaying on a graphical user interface the individual data objects residing in the recovered database;
    receiving a selection of one or more of the individual data objects via the graphical user interface; and
    restoring the one or more selected data objects from the recovered database to one or more storage locations on the production server.

2. The method as recited in claim 1, wherein recovering a backup database from a backup storage location into a recovered database further comprises:
    copying the backed up database from the backup storage location to the recovery storage group located on the production server, the backed up database containing a copy of a database originally located on the production server.

3. The method as recited in claim 1, wherein displaying on a graphical user interface the individual data objects residing in the recovered database further comprises displaying a hierarchical structure of the individual data objects.

4. The method as recited in claim 3, wherein the graphical user interface is further configured to receive a selection of one or more groups of the individual data objects in accordance with the hierarchical structure.

5. The method as recited in claim 1, wherein the production server is a mail exchange production server, and wherein the recovered database is a recovered exchange database containing a backup copy of an exchange database residing on the mail exchange production server, the recovered exchange database containing mail data objects for one or more users.

6. The method as recited in claim 5, wherein identifying each individual data object residing in the recovered database further comprises:
    utilizing an application programming interface configured for parsing data on the recovered exchange database into individual data objects.

7. The method as recited in claim 6, wherein the application programming interface is compliant with a Messaging Application Programming Interface (MAPI) architecture.

8. The method as recited in claim 5, wherein the data objects residing in the recovered database include at least one of users, folders, electronic mail items, calendar entries, contact data, journal entries, notes, and tasks.

9. In a distributed network comprising a mail exchange production server and a backup storage location, the mail exchange production server employing a recovery storage group for performing data recovery operations, a method for performing data recovery of individual data objects, the method comprising:
    recovering a backup exchange database into a recovered exchange database;
    copying the recovered exchange database from a backup storage location to a recovery storage group residing on a mail exchange production server, the recovered exchange database comprising a backup copy of an exchange database residing on the mail exchange production server, the recovery storage group requiring that at least a group of data objects residing in the recovered exchange database be recovered during a recovery operation;
    parsing the recovered exchange database into separate data objects to identify each individual data object residing in the recovered exchange database, the data objects including mail data for one or more users of the mail exchange production server;
    displaying the individual data objects on a graphical user interface;
    receiving a selection of one or more of the individual data objects from via the graphical user interface; and
    restoring the one or more selected data objects from the recovered exchange database to the exchange database residing on the mail exchange production server.

10. The method as recited in claim 9, wherein identifying each data object residing in the identified database further comprises:

utilizing a Messaging Application Programming Interface (MAPI) configured for parsing and identifying individual data objects in the recovered exchange database.

11. The method as recited in claim 9, wherein the data objects residing in the recovered database include at least one of folders, electronic mail items, users, calendar entries, contact data, journal entries, notes, and tasks.

12. The method as recited in claim 9, wherein displaying the individual data objects on a graphical user interface further comprises displaying a hierarchical structure of the individual data objects.

13. The method as recited in claim 12, wherein the graphical user interface is further configured to receive a selection of one or more groups of the individual data objects in accordance with the hierarchical structure.

14. In a distributed network comprising a production server, a backup storage server, and a recovery interface, the production server employing a recovery storage group for performing data recovery operations, a computer program product configured to implement a method of performing data recovery of individual data objects, the computer program product comprising one or more tangible computer readable media having stored thereon computer executable instructions that, when executed by a processor, causes the recovery interface to perform the following:
  recover a recovered database from a backup storage into a production server, wherein the recovered database is stored in a recovery storage group;
  access the recovery storage group containing the recovered database that has been recovered from a backup storage server into the production server, the recovery storage group requiring that at least a group of data objects residing in the recovered database be recovered during a recovery operation;
  parse the recovered database to identify each individual data object residing in the recovered database;
  displaying a graphical user interface that allows a user to access and select the individual data objects from the recovered database;
  receive a selection of one or more of the individual data objects via the graphical user interface; and
  restore the one or more selected data objects to a storage location on the production server.

15. The computer program product as recited in claim 14, wherein the computer executable instructions that cause the recovery interface to display on a graphical user interface the individual data objects from the recovered database further comprise instructions to cause the graphical user interface to display a hierarchical structure of the individual data objects.

16. The computer program product as recited in claim 14, wherein the recovery interface is installed on the production server.

17. The computer program product as recited in claim 14, wherein the production server is a mail exchange production server, and wherein the recovered database is a recovered exchange database containing a backup copy of an exchange database residing on the mail exchange production server, the recovered exchange database containing mail data objects for one or more users.

18. The computer program product as recited in claim 17, wherein the computer executable instructions that cause the recovery interface to identify each individual data object residing in the recovered database further comprise instructions to cause the recovery interface to perform the following:
  utilize an application programming interface configured for parsing into an exchange database and identifying the individual data objects.

19. The computer program product as recited in claim 18, wherein the application programming interface is compliant with a Messaging Application Programming Interface (MAPI) architecture.

20. The computer program product as recited in claim 17, wherein the data objects residing in the recovered database include at least one of users, folders, electronic mail items, calendar entries, contact data, journal entries, notes, and tasks.

* * * * *